United States Patent
Heng et al.

(10) Patent No.: US 6,842,839 B2
(45) Date of Patent: Jan. 11, 2005

(54) CAPACITY MANAGEMENT

(75) Inventors: Selena Heng, Farnham (GB); Ian Highet, Walton-on-Thames (GB); Peter Scudamore, Reading (GB); Ian Ray, Reading (GB); Murali Karunanithy, Catford (GB)

(73) Assignee: Nokia Corporation, Espoo (FI)

( * ) Notice: Subject to any disclaimer, the term of this patent is extended or adjusted under 35 U.S.C. 154(b) by 185 days.

(21) Appl. No.: 10/229,114

(22) Filed: Aug. 28, 2002

(65) Prior Publication Data
US 2003/0065895 A1 Apr. 3, 2003

(30) Foreign Application Priority Data
Sep. 28, 2001 (GB) .............................................. 0123407

(51) Int. Cl.[7] .............................................. G06F 12/00
(52) U.S. Cl. ........................ 711/170; 711/171; 711/133
(58) Field of Search ................................ 709/203, 231; 711/154, 133, 170–173; 715/501.1; 717/174

(56) References Cited

U.S. PATENT DOCUMENTS

| | | | |
|---|---|---|---|
| 6,629,227 B1 * | 9/2003 | Jerding et al. .............. 711/170 |
| 6,766,353 B1 * | 7/2004 | Lin et al. ..................... 709/203 |
| 2001/0052052 A1 * | 12/2001 | Peng ........................... 711/133 |
| 2002/0178279 A1 * | 11/2002 | Janik et al. ................. 709/231 |
| 2003/0088827 A1 * | 5/2003 | Tamas et al. ............. 715/501.1 |
| 2004/0034853 A1 * | 2/2004 | Gibbons et al. ............ 717/174 |

FOREIGN PATENT DOCUMENTS

| WO | WO 01/31442 A2 | 5/2001 |
| WO | WO 01/57673 A1 | 8/2001 |
| WO | WO 01/84320 A2 | 8/2001 |

* cited by examiner

*Primary Examiner*—Nasser Moazzami
(74) *Attorney, Agent, or Firm*—Antonelli, Terry, Stout & Kraus, LLP

(57) ABSTRACT

The present invention relates to capacity management, and more particularly to capacity management on devices which have limited storage capacity. Until recently, however, storage has not been a problem for such portable communication devices since generally the only information stored thereon has been names, addresses and the like. Such data does not require vast amounts of storage and generally easily fits in the storage capacity provided in such devices. Advances in radiotelephone technology, for example, such as accessing the Internet, however, put increasing demands on the limited storage capacity available, especially with an increasing desire to download application files for use on such devices. The present invention overcomes the above mentioned problems.

18 Claims, 5 Drawing Sheets

CAPACITY MANAGEMENT

BACKGROUND OF THE INVENTION

1. Field of the Invention

The present invention relates to capacity management, and more particularly to capacity management on devices which have limited storage capacity.

2. Description of the Prior Art

The storage capacity of devices, such as portable radiotelephones and other portable communication devices, is limited due to the generally small nature of the devices. Any such devices are designed as a compromise between performance, storage capability and the size of the device. Larger devices, such as personal computers (PC) or so-called personal digital assistants (PDA) are generally larger in size than typical mobile radiotelephones and therefore generally comprise greater storage capacity.

Until recently, however, storage has not been a problem for such portable communication devices since generally the only information stored thereon has been names, addresses and the like. Such data does not require vast amounts of storage and generally easily fits in the storage capacity provided in such devices.

Advances in radiotelephone technology, for example, being able to access the Internet, however, puts increasing demands on the limited storage capacity available, especially as there is increasing desire to download application files for use on such devices.

Currently there do not exist any satisfactory ways in which the storage capacity of portable communication devices and other devices having limited storage capabilities may be successfully managed.

SUMMARY OF THE INVENTION

The present invention improves the storage management of devices having limited storage capabilities.

A first aspect of the present invention is a method of controlling the storage of files from a remote location in the memory of a communication device having a user interface, wherein each file comprises a content file, comprising: receiving a descriptor file containing details of an associated content file; determining, from the descriptor file whether there is sufficient space in the memory available for storing the content file in the communication device and; where it is determined that there is sufficient space in the memory, storing the content file in the memory.

A second aspect of the present invention is an apparatus for controlling the storage of a file from a remote location in the memory of a communication device, wherein the file comprises a content file, comprising: a transceiver for receiving a descriptor file containing details of an associated content file; a processor for determining, from the descriptor file, whether there is sufficient space in the memory for storing the associated content file in the communication device and where it is determined that there is sufficient space in the memory, storing the content file in the memory.

The present invention advantageously provides a simple and efficient way for the storage capacity to be managed. Further advantageously, the present invention enables storage management to be performed by users without requiring in-depth knowledge of file management systems.

BRIEF DESCRIPTION OF THE INVENTION

The invention will now be described, by way of example only, with reference to the accompanying diagrams, in which.

Figure 1:
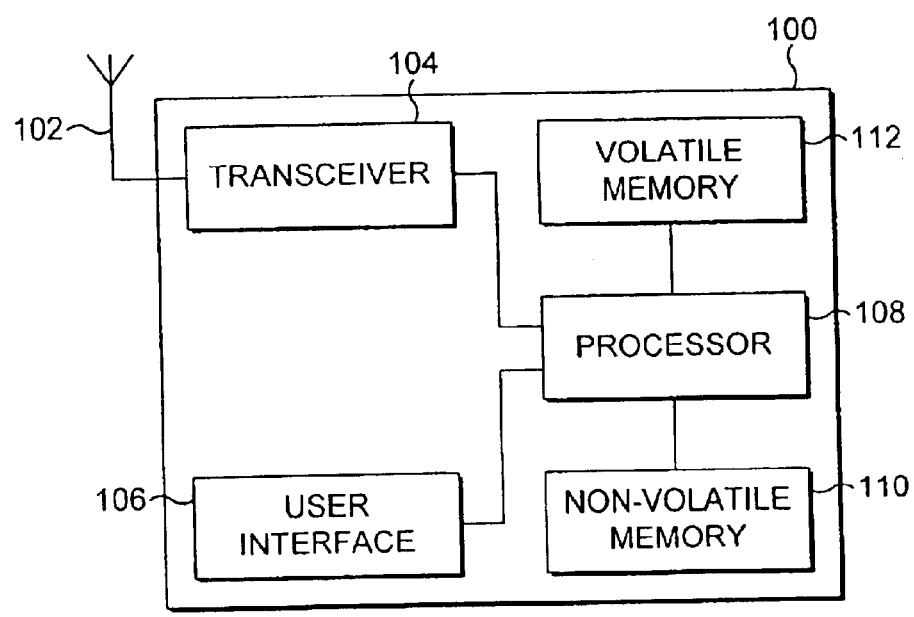
FIG. 1 is a block diagram showing an overview of a portable communication device according to the present invention.

FIG. 1 is a block diagram showing an overview of a portable communications device 100 according to the present invention. The communication device has an antenna 102 for receiving and transmitting signals from a remote network, such as a GSM, CDMA or other communications network. The antenna 102 may be either mounted internal or external to the communication device 100. A transceiver 104 controls the reception and transmission of signals from the antenna 102, under control of a processor 108. A user interface 106 is also provided to enable a user to enter data and to control the communication device, for example, via a keypad, and also to display information to the user, for example, via a liquid crystal display unit. The communication device 100 may function as typical portable radiotelephone, for example, for making and receiving telephone calls, accessing data services, sending and receiving text-based messages, etc., as will be appreciated by those skilled in the art. Additionally, the communication device may download data and application files from a remote network, for use on the communication device 100. The communication device 100 has a number of memories 110 and 112. Memory 110 is a non-volatile memory, such as an EEPROM, for storing, for example, downloaded files, address and telephone information etc. Memory 112 is a volatile memory, such as a random access memory (RAM), and is used by the communication device for the temporary storage of data and files, etc.

Figure 2:
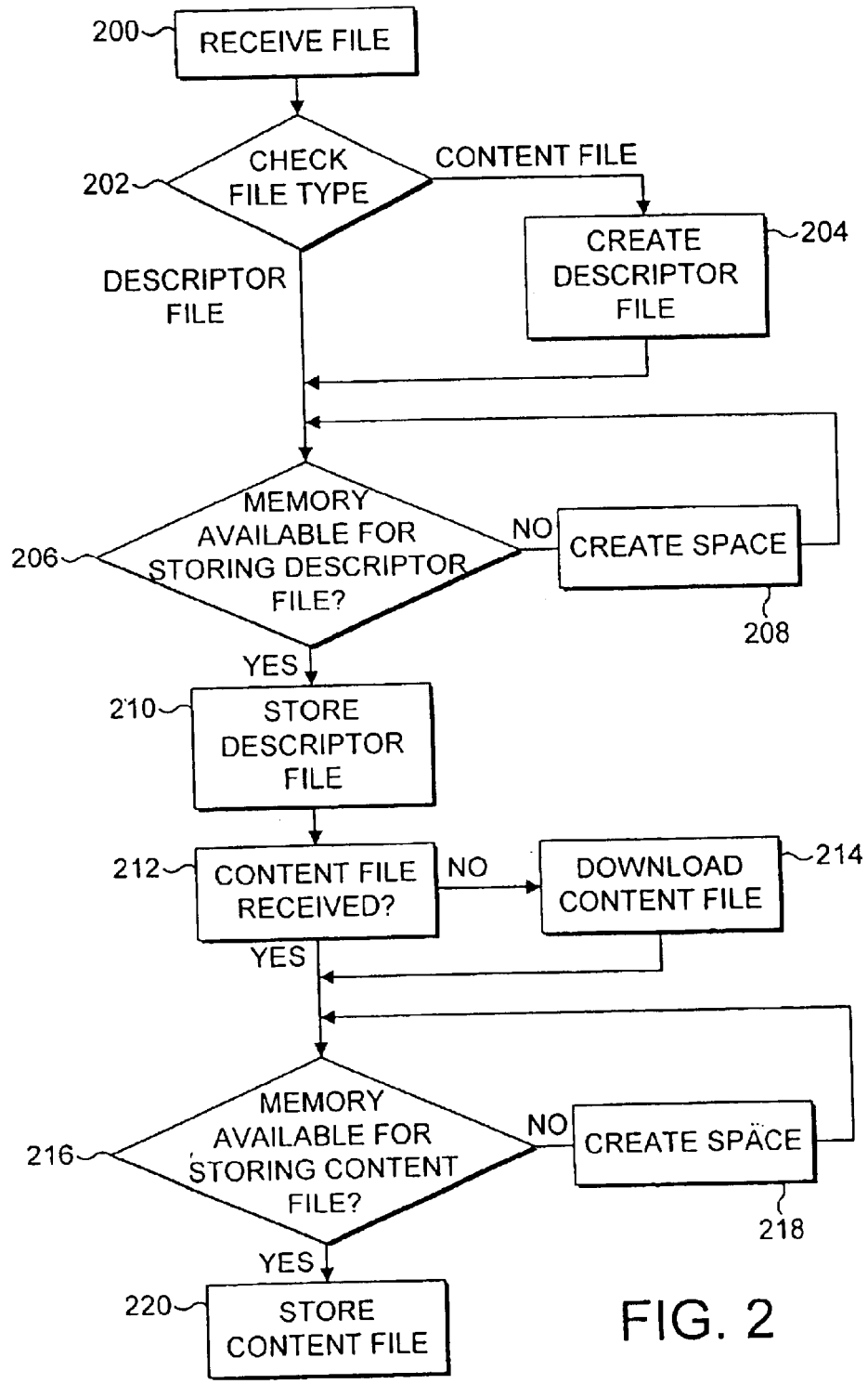
FIG. 2 is a flow diagram outlining the major steps involved in downloading a file from a remote network to the communication device.

FIG. 2 is a flow diagram outlining the major steps involved in downloading a file from a remote network to the communication device.

According to a preferred embodiment of the present invention, the type of files to be received by the communication device are JAVA files. As is known as part of JAVA specification JSR-000037 Mobile Information Device Profile (MIDP), several types of JAVA files exist. A first type is the content or archive file (JAR), which typically contains an application program or a collection of files which collectively make up the application program. A second type of file is a descriptor file (JAD) which describes numerous characteristics of its associated JAR file. For example, a descriptor file may contain details of the size of a content file, the date it was created, the remote location of the content file etc. A descriptor file is therefore small compared to its associated content file. Typically, JAVA files are provided with both a content and a descriptor file, although it is possible that a content file exists without a corresponding descriptor file.

The present invention is described herein with reference to the files according to the JAVA specification. Those skilled in the art will appreciate, however, that the inventive concepts described herein can equally be applied to other file types, formats and systems, without detracting from the teachings of the present invention.

A file is received by the communication device at step 200. This could have been as a result of a user requesting to download or receive the file, as will be appreciated by those skilled in the art. Once the file has been received, the file type is checked at step 202 to determine the type of file which has been received. If a content file has been received (i.e. without an associated descriptor file), an associated descriptor file is created at step 204. The created descriptor file may contain minimal information compared to a descriptor file generated by the content file creator, and preferably includes information such as size of the content file and the remote location of the content file. If a descriptor file has been received, the information relating to the associated content file will already be available.

In a preferred embodiment of the present invention, received files are temporarily stored in volatile memory (e.g. memory 112) until a decision is made either to store them in non-volatile memory (e.g. memory 110) or to erase them from the volatile memory.

The next step 206 is to check whether there is sufficient space available in the non-volatile memory 110 to store the descriptor file. If there is not sufficient space available, then space may be made in the memory 110 according to step 208, further described below. If there is sufficient space available in the non-volatile memory 110, the descriptor file is stored therein at step 210.

At step 212, the content file is downloaded if it is not already present at step 214. Preferably, the downloaded file is received in volatile memory (memory 112). The non-volatile memory 110 is again checked to see whether there is sufficient space available for storing the content file at step 216. Again, if there is not sufficient space available, then space may be made at step 218 in the memory 110 in order to store the content file. The content file is finally stored in the non-volatile memory 110 at step 220.

If for any reason the download of the content file is interrupted, for example due to power failure, loss of network connection etc., or if the content file is corrupted during download, if the descriptor file is already present in the communication device this will allow the user to either resume or to repeat the download at a later time.

Advantageously the received files are stored in volatile memory 112 prior to making space for storing the received files in the non-volatile memory 110. This is a safeguard in case a received file is corrupted or if download of file is interrupted, and helps ensure that only valid and correct files are stored in the non-volatile memory 110.

Those skilled in the art will appreciate that the steps described above are exemplary in nature, and it will be appreciated that a lesser or greater number of steps may be implemented without detracting from the concepts of the present invention.

Figure 3:
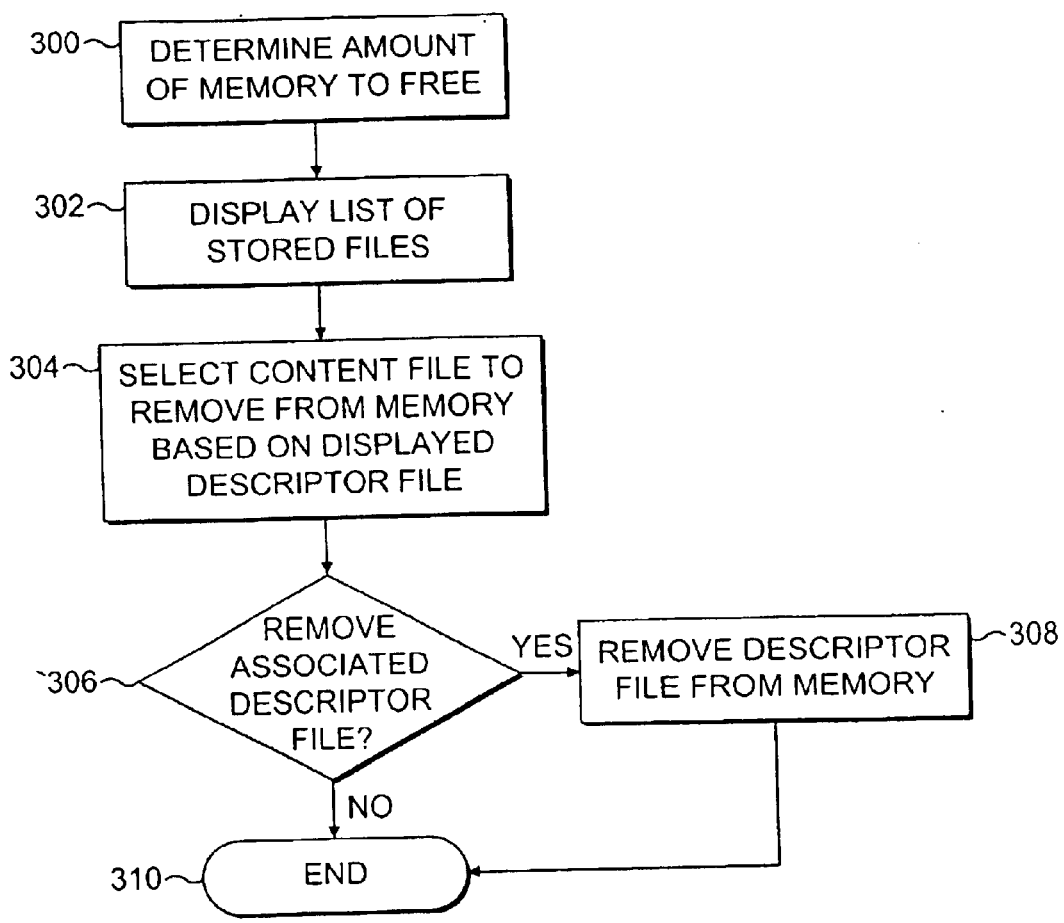
FIG. 3 is a flow diagram outlining the main steps involved in creating space, for example, in response to steps 208 or 214 of FIG. 2.

FIG. 3 is a flow diagram outlining the main steps involved in creating space, for example, in response to steps 208 or 218 of FIG. 2. FIG. 3 corresponds to FIG. 5*b*.

The amount of space in the non-volatile memory 110 which needs to be freed is determined by step 300. Then, a list of currently stored descriptor files having associated stored content files is displayed, via the user interface 106, to the user. The description files act as a type of bookmark, and serve to identify the files stored in the memory 110.

The user is requested to select a descriptor file from which the associated content file is to be removed from the non-volatile memory 110 at step 306. Since a content file is typically much greater in size than its associated descriptor file, it is advantageously possible to retain the descriptor file without having to retain the associated content file. Since the descriptor file contains the remote location of the associated content file, this enables the communication device to download the associated content file from the remote location, without having to permanently store the content file in the memory 110. This is particularly advantageous for content files which may be used infrequently.

Once the content file has been removed from the memory 110, the user is further requested whether he also wishes to remove the associated descriptor from the memory 110 at step 306. By removing the descriptor file, the user frees up further space in the memory 110.

Figure 4:
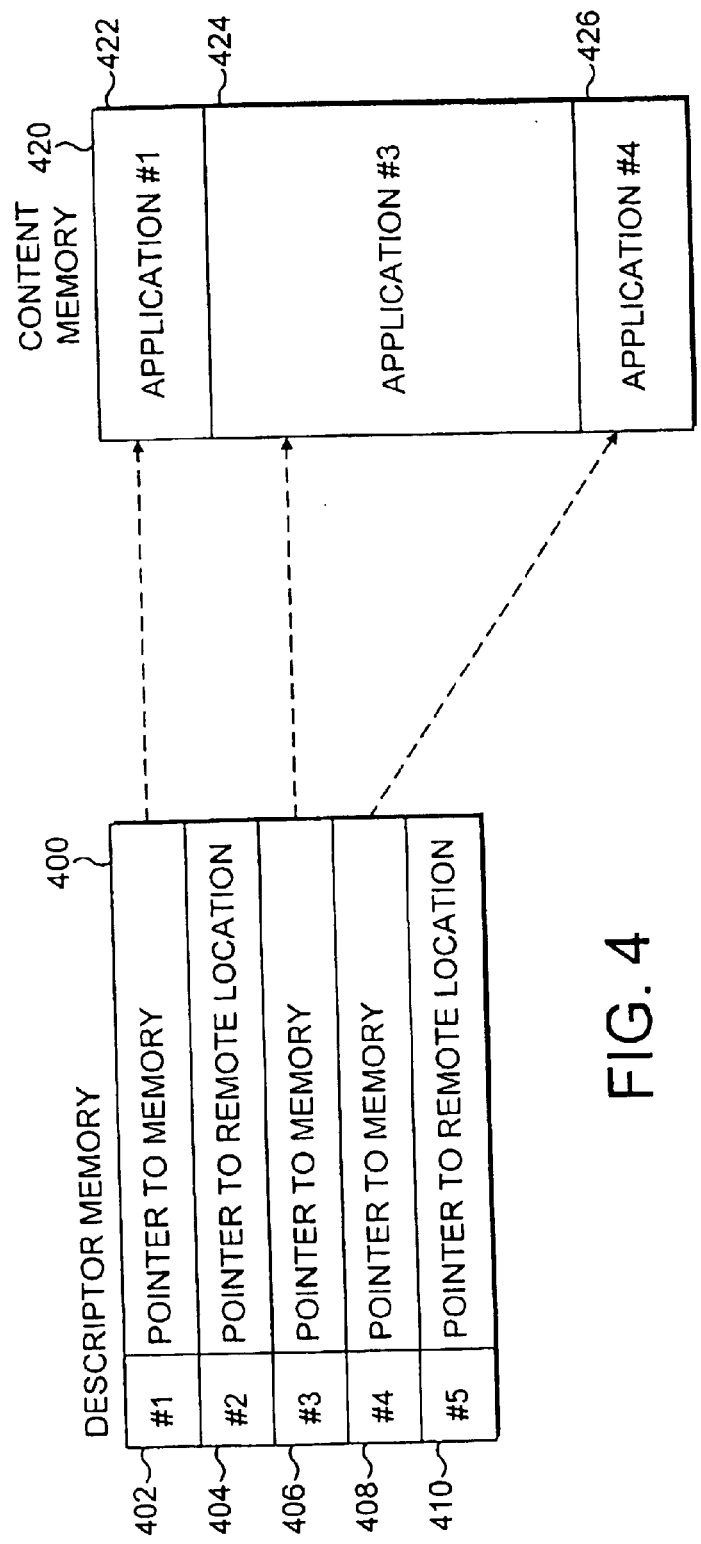
FIG. 4 is a block diagram showing one way in which the memory 110 may be organized in accordance with the present invention.

FIG. 4 is a block diagram showing one way in which the memory 110 may be organized in accordance with the present invention. FIG. 4 shows a descriptor memory 400 which stores a number of descriptor files 402, 404, 406, 408 and 410. In some instances as shown (namely, descriptor memory location 402, 406 and 408), the descriptor files point to their associated content files which are stored in a content memory 420. This is because the content file is present in the non-volatile memory 110. Irrespective of the fact that a content file may be present in the non-volatile memory 110, the descriptor file will generally still contain the remote location of the file. This enables the actual content file to be deleted from the non-volatile memory, while still retaining the information needed to retrieve the file at a later date if required.

Where only the descriptor file is present in the non-volatile memory 100, the descriptor file #2, stored in location 404 points not a physical memory location, but to the remote location of the associated content file. This pointer could be, for example, a universal resource locator (URL) as is commonly used in Internet-type networks. Where only a descriptor file resides in the memory 110, this may be due to the above described technique whereby a content file may be removed from the memory 110 without removing the associated descriptor file. In this way, a link to a content file may be maintained in the memory 110 without having to permanently store the associated content file in the memory 110. Advantageously this frees up space in the memory 110 to allow additional descriptor and content files to be stored. Additionally, a descriptor file may be stored without an associated content file if, for any reason, the download of the content file was interrupted or not successfully completed.

The descriptor memory 400 and the content memory 420 may reside in separate portions of the memory 110, or may exist as separate memory devices.

Figure 5A:
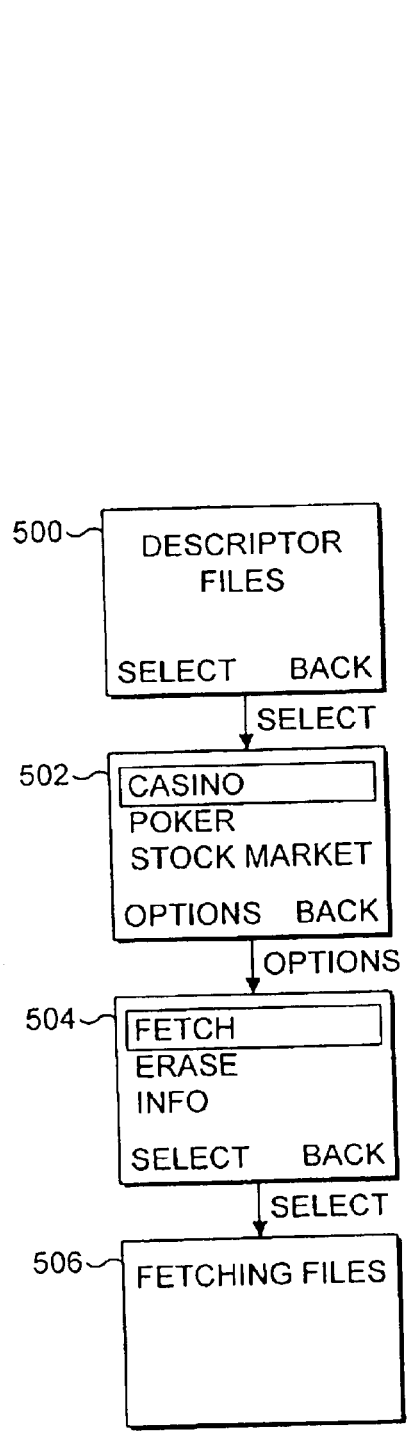
FIGS. 5A and 5B shows a number of exemplary menu structures according to the present invention.

FIG. 5A shows one example comprised of steps 500–506 of how a menu structure on a communication device could be arranged to enable a user to download a file for which only the descriptor file is stored on the communication device.

Figure 5B:
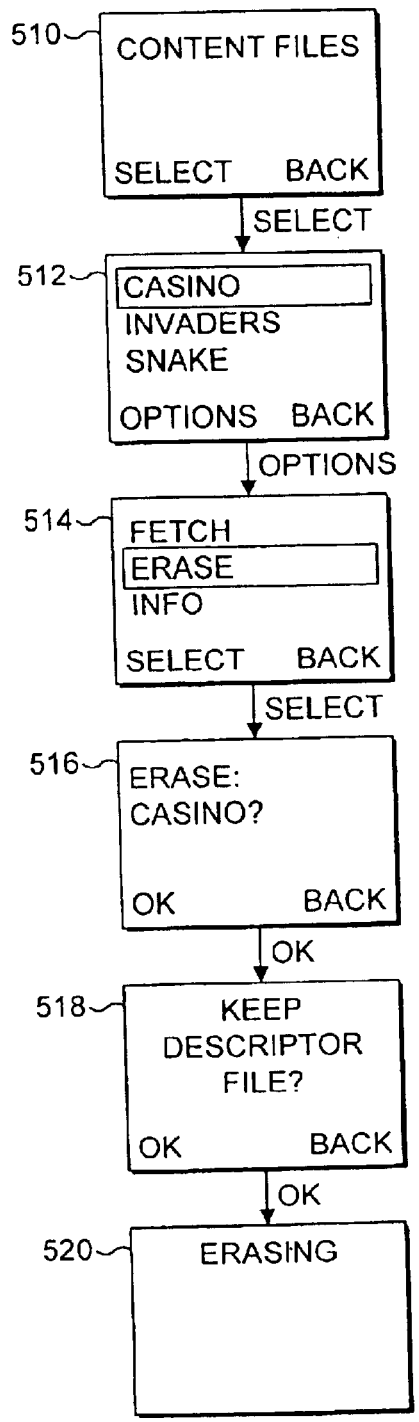

FIG. 5B shows one example comprised of steps 510–520 of how a menu structure on a communication device could be arranged to enable a user to erase a content file stored on a communication device, additionally allowing the user to erase the associated descriptor file. FIG. 5B corresponds to the steps illustrated in FIG. 3.

According to further embodiment of the present invention, descriptor files may advantageously be sent to and received from other communication devices. In this way, a user may receive a descriptor file, for example, via the commonly used short message service (SMS) or other similar protocol. This is particularly attractive since the descriptor files are generally small in size. Upon receiving a descriptor file in this manner, a user may store or reject the descriptor file. Subsequently, should the user wish to use the content file, the communication device can download the content file from the remote location identified in the received descriptor file. A further advantage of this embodiment is that it enables files to be shared, without infringing copyright of the potentially valuable content files. For example, a descriptor file can be sent free of charge, and only when a user wishes to download the associated content file would a charge be made to the user.

What is claimed is:

1. A method of controlling storage of files from a remote location in a memory of a communication device having a user interface, wherein each file comprises a content file, comprising:

receiving a descriptor file containing information regarding an associated content file;

determining from the descriptor file whether there is sufficient space in the memory available for storing the content file in the communication device;

when a determination is made that there is sufficient space in the memory, storing the content file in the memory;

when a determination is made that there is not sufficient space in the memory, creating space in the memory to allow the content file to be stored; and wherein the step of creating space comprises presenting, via the user interface, a list of descriptor files corresponding to content files currently stored in the memory, requesting the user to choose a descriptor file from the list, and removing an associated content file from the memory.

2. The method of claim 1, comprising:

requesting that the user additionally identifies whether to remove the chosen descriptor file.

3. The method of claim 1, wherein:

the step of receiving receives files into a volatile memory.

4. The method of claim 1, wherein:

the step of storing is in a non-volatile memory.

5. The method of claim 1, wherein:

the descriptor files are JAVA descriptor files.

6. The method of claim 1, wherein:

the content files are JAVA archive files.

7. The method of claim 1 comprising:

transmitting a descriptor file to a compatible communication device.

8. The method of claim 1, wherein:

the communication device is a portable radio telephone.

9. An apparatus for controlling storage of a file from a remote location in a memory of a communication device having a user interface, wherein the file comprises a content file, comprising:

a transceiver which receives a descriptor file containing information regarding an associated content file;

a processor which determines, from the descriptor file, whether there is sufficient space in the memory for storing the associated content file in the communication device;

when a determination is made that there is sufficient space in the memory, storing the content file in the memory;

the processor creates space in the memory when a determination is made that there is not sufficient space in the memory for storing the content file; and the user interface presents a list of descriptor files corresponding to content files currently stored in the memory and requests the user to choose a descriptor file from the list, and the processor causes removing an associated content file from the memory.

10. The apparatus of claim 9, wherein:

the memory comprises a volatile and a non-volatile memory.

11. The apparatus of claim 9, wherein:

the transceiver receives files into the volatile memory.

12. The apparatus of claim 9, wherein:

the processor stores the files in the non-volatile memory.

13. The apparatus of claim 9, wherein:

the descriptor files are JAVA descriptor files.

14. The apparatus of claim 9, wherein:

the content files are JAVA archive files.

15. The apparatus of claim 9, wherein:

the transceiver transmits a descriptor file to a compatible communication device.

16. A method of controlling storage of files from a remote location in a memory of a communication device having a user interface, wherein each file comprises a content file, comprising:

receiving a content file;

creating a descriptor file containing information regarding the received content file, including a remote location of the received content file if only a content file has been received;

associating the created descriptor file with the received content file; and separately storing the received content file and the created descriptor file whereby the received content file may be deleted without deleting the created descriptor file.

17. A method of controlling storage of files from a remote location in a memory of a communication device having a user interface, wherein each file comprises a content file, comprising:

receiving a descriptor file, containing information regarding at least a remote location of an associated content file, for allowing the retrieval of the content file from the remote location;

determining from the descriptor file whether there is sufficient space in the memory available for storing the content file in the communication device; and when a determination is made that there is sufficient space in the memory, storing the content file in the memory.

18. A method as claimed in claim 16, comprising:

deleting a stored content file from the memory of the communication device; and subsequently retrieving the content file from the remote location defined in the information contained in the descriptor file.

* * * * *